United States Patent [19]

Chung

[11] Patent Number: 4,933,787

[45] Date of Patent: Jun. 12, 1990

[54] TAPE LOADING DEVICE FOR HIGH-SPEED SEARCH OF A VCR

[75] Inventor: Young B. Chung, Seoul, Rep. of Korea

[73] Assignee: Goldstar Co., Ltd., Seoul, Rep. of Korea

[21] Appl. No.: 225,841

[22] Filed: Jul. 29, 1988

[30] Foreign Application Priority Data

Jul. 31, 1987 [KR] Rep. of Korea ............... 12943/1987

[51] Int. Cl.$^5$ ...................... G11B 15/665; G11B 15/61
[52] U.S. Cl. ...................................................... 360/85
[58] Field of Search ........................................... 360/85

[56] References Cited

U.S. PATENT DOCUMENTS

| | | |
|---|---|---|
| 3,402,868 | 9/1968 | Hammond ........................... 226/190 |
| 3,907,234 | 9/1975 | Sato et al. ........................... 226/194 |
| 4,482,085 | 11/1984 | Tanaka et al. ...................... 226/187 |
| 4,729,500 | 3/1988 | Gwon ................................... 226/190 |

Primary Examiner—Robert S. Tupper
Attorney, Agent, or Firm—Birch, Stewart, Kolasch & Birch

[57] ABSTRACT

A tape loading device for high-speed search of a VCR which is designed to exactly search out a position of a program recorded on the tape by the user, and it comprises a loading gear provided with a teethless part and a projection, a rotating body provided with a pair of locking jaws spaced with a predetermined angle each other, and a loading arm connected with the rotating body by a bush to transmit the rotation force from the loading gear to a slant post assembly.

1 Claim, 6 Drawing Sheets

TAPE LOADING DEVICE FOR HIGH-SPEED SEARCH OF A VCR

BACKGROUND OF THE INVENTION

1. Field of the Invention

The present invention relates to a tape loading device for a high-speed search of a video cassette recorder (hereinafter referred to as a "VCR"), and more specifically to a tape loading device for high-speed search designed to search out of the position of a program recorded on the tape by a user in a high-speed running mode, namely the FF/REW mode. In particular, the present invention relates to a tape loading device for the high-speed search of a VCR, designed to search out the position on a tape where a program is recorded. The recording and searching of specific signals for searching for a picture is designed to be carried out by the same head, and is intended to reproduce any desired program.

2. Description of the Prior Art

The conventional tape loading device for a high-speed search is constructed in the manner as that schematically shown in FIG. 1, on an ordinary deck mechanism in which a tape T is drawn out from a supply reel 2 the tape cassette 1 is placed on the deck, is wound on a rotary head drum 5 in a predetermined angle through a supply roller 3 and an erasing head 4 and then as wound on a winding reel 9 through an audio control head 6, a capstan shaft 7 and a pinch roller 8. A search sensor 11 is disposed on the base plate 10 in the zone adjacent to the central opening 1a of the cassette 1 so that a user can record determined signals in the initial part of a program using the erasing head 4 located on the supply side of the tape T at the time of recording the program on the tap T. Whenever the user desires to record the program again, he may use the search sensor 11 disposed adjacent to the opening 1a of the cassette 1 to read the signal recorded on the tape T in FF/REW mode and search out the recorded position of the signal. The tape T is then returned automatically to its reproduction position.

In order to maintain the tap T in a reproduction mode, the power of the driving motor 12 is, as shown in FIG. 2, transmitted to a cam gear 16 through reduction gear trains 13, 13'; 14, 14'; 15, 15'. As the cam gear 16 rotates, a rack gear 17 is rotated along the locus of a cam groove 16a. A pinion gear 18 rotates as much as the rotation stroke of a rack gear 17, and a pair of loading gears 19, 19' engaged with an operating gear 18' is thereby a pair of slant post assemblies 20, 20' connected to the operating gear 18' through a lever system draws the tape T and are pressed to a pair of stoppers 21, 21' to complete the loading. Meanwhile, to the loading gears 19, 19', to be engaged with the operating gear 18' to transfer the slant post assembly 20, 20', are connected the ends of levers 22, 22' and loading arms 23, 23' on which the slant post assembly 20, 20' are mounted. The loading gears 19, 19' are, as shown in FIG. 3 (represented by only a gear assembly on one side), connected to a loading arm 23 by means of a brushing 24 adapted to fit in an annular groove 19a, since the projecting portion 19b has the annular groove 19a formed in the middle, lower portion of the bottom thereof. To a fixing member 23a mounted saliently at one edge of the loading arm 23 is attached one end of a coil spring 27 for pressing the slant post assembly 20 to the stopper 21, which is wound around the peripheral surface of a projecting part 19b of the loading gear 19. The other end is fixed to a connecting pin 19c mounted saliently on one side of the bottom and caught by a cut-off portion 23b formed at a predetermined angle at one edge of the loading arm 23.

According to the conventional mechanism having the above-described structure, when signals are recorded on the tape T, they are recorded by the erasing head 4 disposed in the running path of the tape T in the reproduction mode. In a complete loading state, and when signals are search again, they are searched out by the search sensor 11 which is quite different from the signal recording position in the FF/REW mode. Consequently there is a problem in that when a desired position is searched out and then the tape T is reloaded and reproduced, it is impossible to exactly search out the position of a desired picture.

SUMMARY OF THE INVENTION

The present invention is designed to solve such conventional problems, and to enable a single head to perform the recording of signals and the searching to read such signals by modifying the structure of one loading gear assembly so as to rotate only one loading gear assembly in a predetermined angle when the signals recorded on the tape are reread thus the tape is maintained in a half-loaded state in which the tape comes into close contact with the audio control head.

BRIEF DESCRIPTION OF THE DRAWINGS

Embodiments of the present invention will now be described in more detail, by way of example, according to FIGS. 4 to 6 with reference to FIGS. 1 to 3.

DETAILED DESCRIPTION OF THE INVENTION

Figure 1:
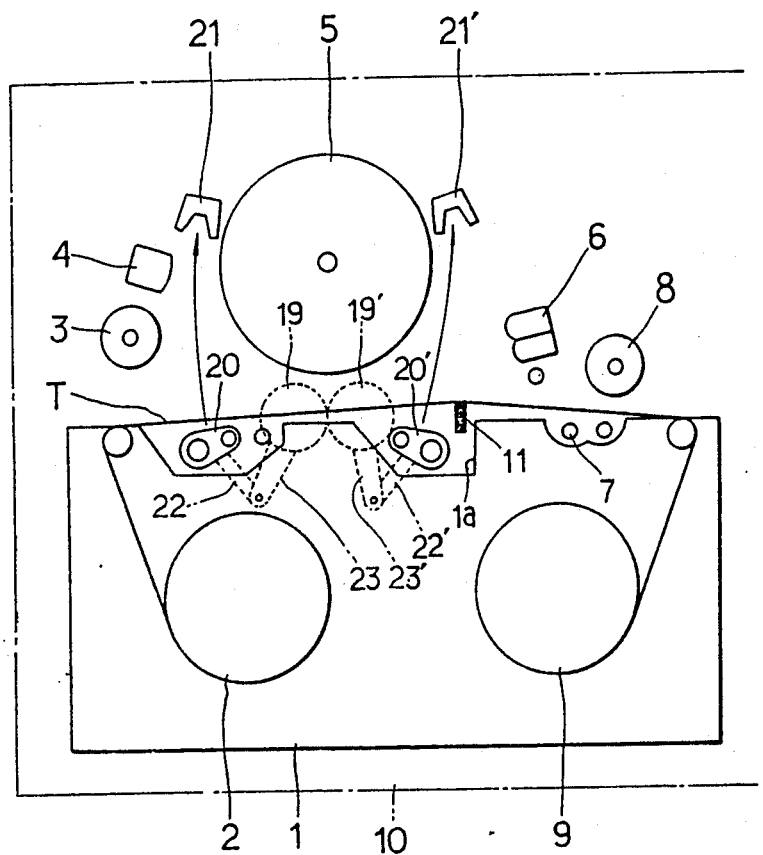
FIG. 1 is a plan view showing schematically a state where the tape cassette is placed on a conventional deck mechanism.
Figure 2:
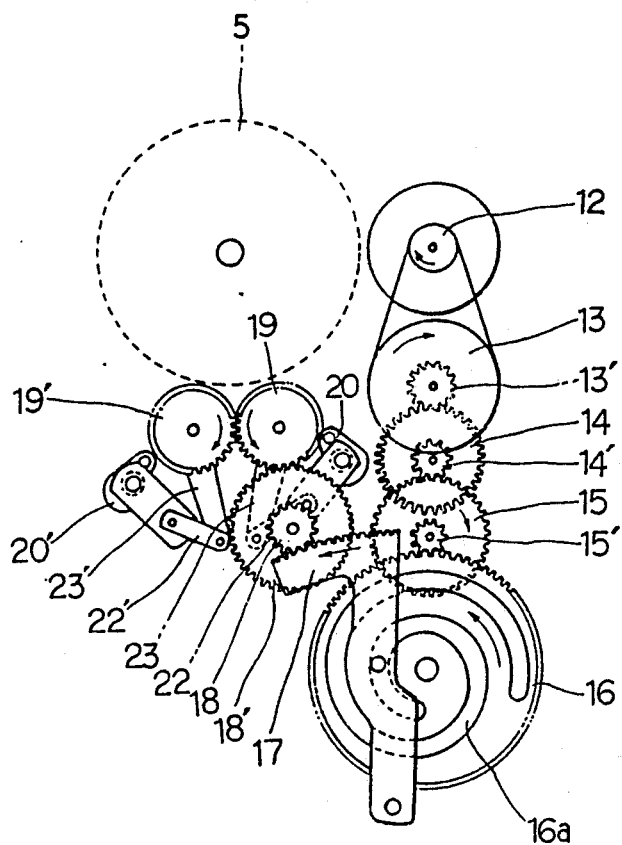
FIG. 2 is a bottom view showing a conventional loading mechanism.
Figure 3:
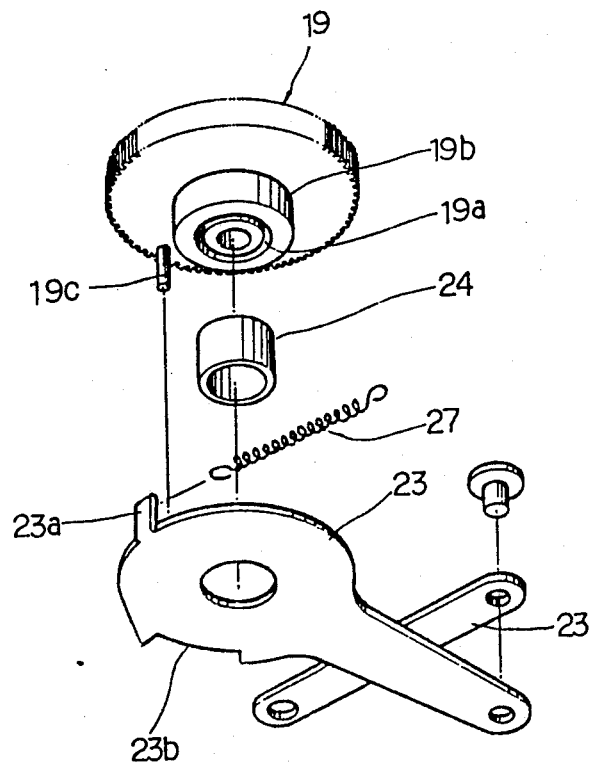
FIG. 3 is a perspective view showing a construction of a conventional loading gear assembly.

In the description of the present invention, parts having the same construction as conventional ones shall be indicated with the same reference numerals.

Figure 4:
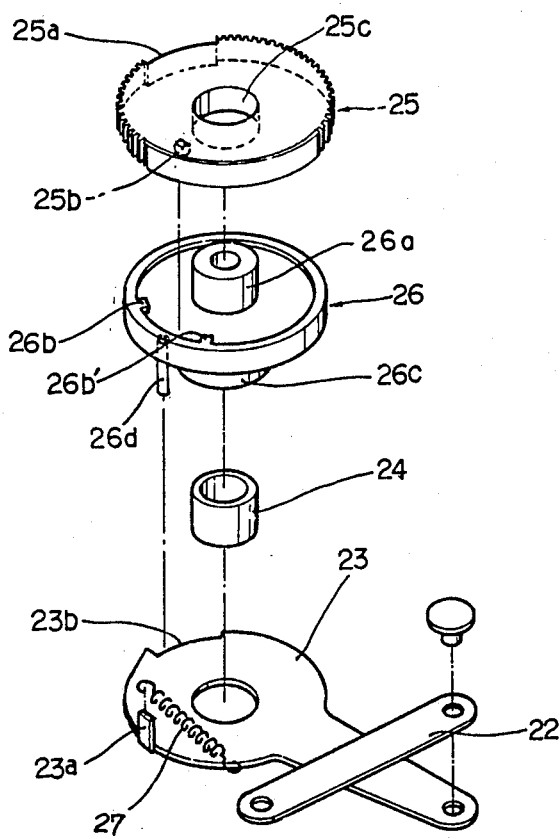
FIG. 4 is a perspective view showing a construction of a loading gear assembly according to the present invention.
Figure 5:
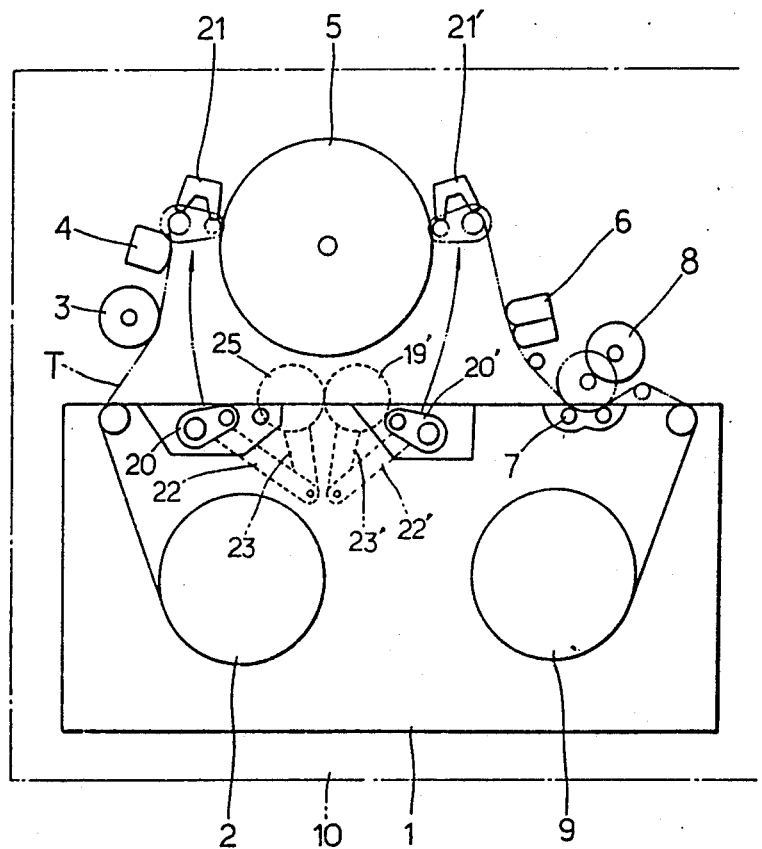
FIG. 5 is a plan view showing schematically a stop mode state of a deck mechanism on which is mounted a loading device according to the present invention.

FIG. 4 is a perspective view of a loading gear assembly, showing a construction of an essential part of the present invention, in which on a peripheral surface of a loading gear 25 is formed a teethless portion 25a in a predetermined angle, and on one side of the lower surface of the bottom thereof is mounted saliently a projection 25b, and in the middle area is formed a shaft hole 25c.

To the lower side of the loading gear 25 is rotatably coupled an annular rotating body 26, ion the central upper surface of which is formed a hollow shaft 26a which is rotatably fitted in the shaft hole 25c. On the external edge of the upper surface of the rotating body 26 is formed a pair of locking jaws 26b, 26b' having a predetermined spaced apart relatively in the direction of the shaft 26a so that the projection 25b mounted saliently on the lower surface of the loading gear 25 is located between the locking jaws 26b, 26b'. In the center of the lower surface of the rotating body 26 is mounted an annular projecting part 26c extended in the downward direction and provided with an annular groove (not shown) in which one end of a bushing 24 is rotatably inserted. The other end of the bushing 24 is coupled with the loading arm 23.

Since a connecting pin 26d is mounted downwardly and saliently on one side of the lower surface of the bottom of the rotating body 26, and fitted in the cut-out part 23b formed in a predetermined angle on a peripheral edge of the loading arm 23, when the loading arm 23 is coupled with the lower side of the rotating body 26, it plays a role in transmitting the rotational force of the loading gear 25 to the rotating body 26 through the projection 25b and the locking jaws 26b, 26b'.

Figure 6:
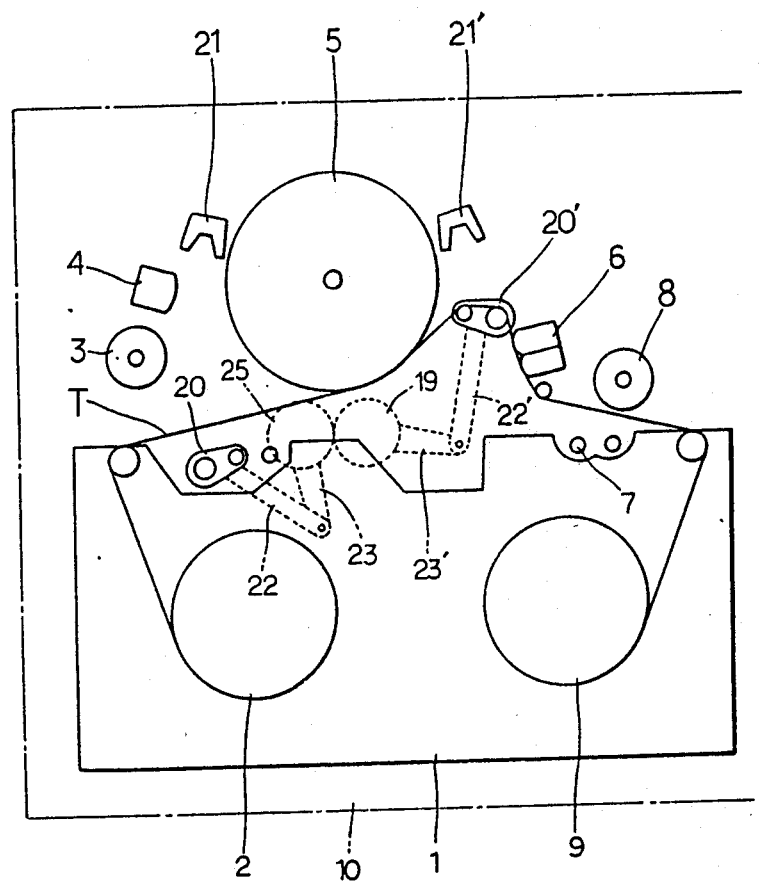
FIG. 6 is a plan view showing schematically the loading device of the present invention in the FF/REW mode for high-speed searching.

The operating conditions and effects of the present invention will now be described. The present invention is characterized in that the position of one slant post assembly 20' in the FF/REW mode for high-speed search is different from that of the conventional one. That is to say, according to the present invention, the tape T is wrapped around an audio control head 6 at the time of the FF/REW mode for high-speed search at a predetermined angle in the half-loading state as shown in FIG. 6. The purpose for this is to carry out the function to record specific signals on the tape T and to search for them on the tape T only with the single audio control head 6, in contrast to the conventional system. According to the present invention, the projection 25b on the lower surface of the left loading gear 25 is positioned to contact the locking jaw 26b of the rotating body 26 in a stop state. In case it continues to proceed in the FF/REW mode for making a high-speed search in such a state, the power of the driving motor 12 is transmitted to the left loading gear 25 through the same channel as the conventional one, but since the projection 25b on the lower surface of the loading gear 25 is in contact with the locking jaw 26b of the rotating body 26, the loading gear 25 does not transmit the force of rotation to the rotating body 26 until the projection 25b contacts the other locking jaw 26b'.

However, when the projection 25b of the left loading gear 25 is rotated from the locking jaw 26b of the rotating body 26 until it contacts a second locking jaw 26b', the force of rotation is transmitted to the right loading gear 19' with which it is engaged and the loading gear 19' is thereby rotated. Accordingly the slant post assembly 20' connected to the loading arm 23' on the lower side thereof through the lever 22' advances in the half-loading state as shown in FIG. 6 and the tape T is wrapped around the audio control head 6.

Therefore, it is possible to search out signals recorded on the tape T using the audio control head 6 in the high-speed running mode in such a half-loading state.

On the other hand, when the tape T is loaded from such a state to a complete loading state for reproducing it, and the loading gear 25 continues to rotate, the rotational force of the rotating body 26 is transmitted to the rotating body 26, and thereby the slant post assembly 20 is advanced. In this situation the projection 25b on the lower surface of the loading gear is in contact with the locking jaw 26b' of the rotating body 26. At this moment, the teethless part 25a of the loading gear 25 meets with the other loading gear 19', which results in an idle running of the loading gear 19' as long as the circumference of the teethless part 25a, and the left slant post assembly 20 is advanced until it is positioned on the same line as the right slant post assembly 20' which has already advanced. In this way, at the moment both slant post assemblies 20, 20' are aligned, the left loading gear 25 is engaged with the right loading gear 19' and they are able to advance at the same time toward the stoppers 21, 21'.

The present invention as described hereinbefore has the effect that it is possible to perform the recording and searching for of signals for searching a picture with the same head, using a simple structural modification of the conventional deck mechanism, and thus it is possible to carry out any desired function without making the general structure unduly complex.

What is claimed is:

1. A tape loading device for the high-speed search of a video cassette recorder which comprises:
   a loading gear provided with a teethless portion formed on its circumferential surface at a predetermined angle and a projection member extending from the side thereof;
   a rotating body provided with a pair of spaced-apart locking jaws formed on an upper surface thereof and a coupling pion mounted to the bottom of the rotating body and extending in the downward direction, said rotating body being rotatably coupled to the lower surface of the loading gear in a position such that the projection member of the loading gear is positioned between the locking jaws;
   an annular projecting member extending from the bottom of said rotating body, said annular projecting member provided with an annular groove;
   a bush rotatably fitted in the annular groove of the annular projecting member;
   a loading arm provided with a cut-out portion formed on its circumferential surface in a predetermined angle for operatively receiving the coupling pin of the rotating body, said loading arm being connected to a slant post assembly through the intermediary of a lever, and the loading arm is coupled to the lower side of the rotating body by said bush in said position where the coupling pin of the rotating body is positioned in said cut-off portion; and
   spring means connected to said loading arm and said coupling pin for biasing the rotating body and loading arm operating relationship.

* * * * *